Oct. 8, 1929.  C. ELLIS  1,730,564
HEAT DETECTING MILK AND CREAM CONTAINER
Filed June 27, 1925
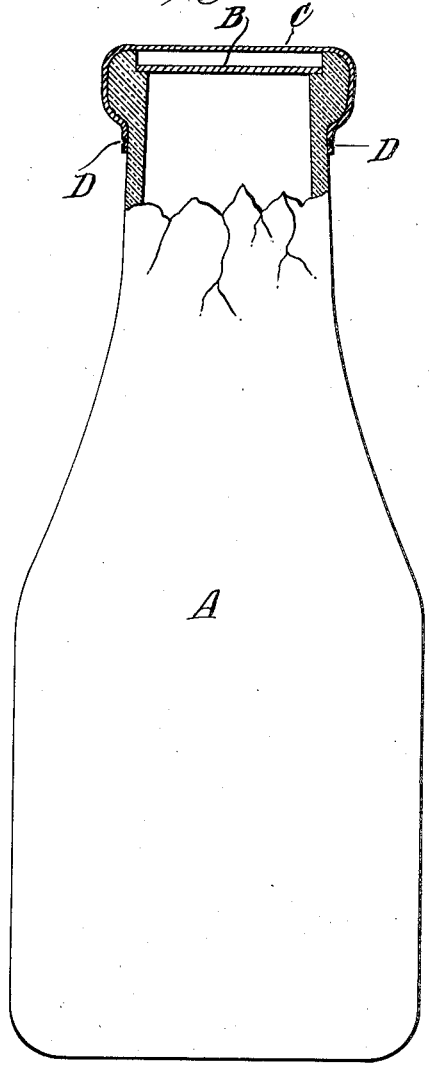
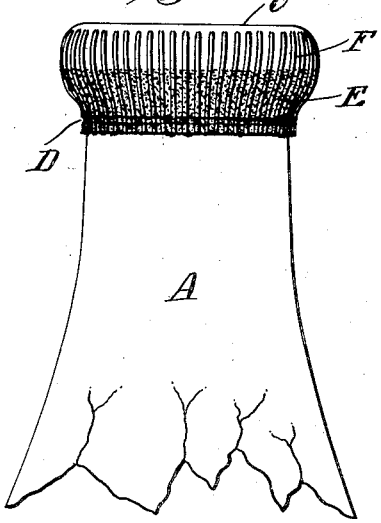
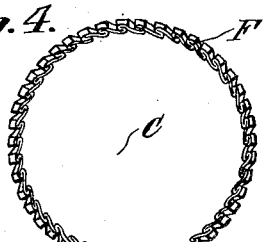
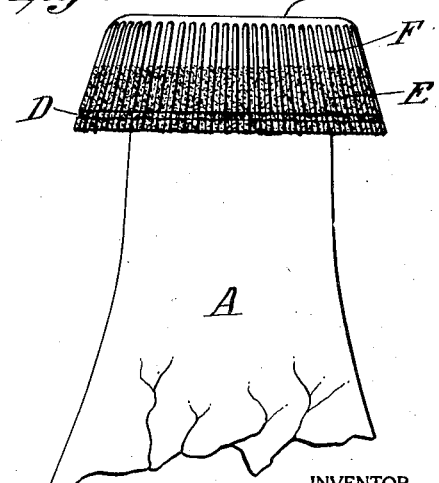
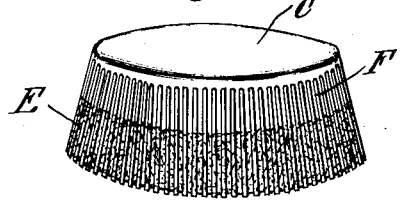
INVENTOR
Carleton Ellis Patented Oct. 8, 1929

1,730,564

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

HEAT-DETECTING MILK AND CREAM CONTAINER

Application filed June 27, 1925. Serial No. 40,040.

This invention relates to a heat-detecting milk and cream container comprising a bottle with the mouth and bead or mouth flange thereof covered with a hood cap of stiff paper crimped against said bead or flange and held in place by an impregnum of a binding composition having the property of losing its binding character on exposure to an undue rise in temperature, one which is unsafe for such dairy products; whereby the crimped portion of said cap separates from said bead and unfolds or expands by extension of the crimped portions thereof thereby serving to indicate through such unfolding and spreading any undue exposure of said dairy products to temperatures inimical to their purity and favorable to the rapid growth of bacteria. The invention also embraces a hood cap of the character described used for the purpose and with the result set forth in the foregoing.

This application is a continuation in part of my copending applications, Serial Nos. 31,719; 29,258 and 27,997.

In the present invention the ordinary form of milk bottle or cream bottle may be used and the closure therefor may be the usual round paper disc or the disc may be omitted and the hood cap alone be the only closure. In the latter case a particularly heavy impregnum of the binding agent may be required and in some cases the surface of the cap should be quite heavily coated. This however depends upon the stiffness and crimping or folding qualities of the paper, a point which will be discussed later.

In good dairy practice milk is kept at a temperature of 50° F. or lower during the bottling and other operations other than pasteurizing. In careless handling or through failure of refrigerating cars to be properly iced or through leaving milk on porches exposed to sun during the summer months or other conditions which need not be described in detail milk may become heated to a point where bacteria multiply with enormous rapidity and milk becomes unsafe to consume in the raw state. The object of the present invention is to provide an indicator which will in a manner indicate whether or not the milk has been kept moderately cool during the time it has been handled in the bottled state.

To this end I employ a covering for the bottle mouth in the form of a cap which has crimped sides and is more or less in the shape of a ramekin. This is impregnated or coated in whole or in part and preferably only along the skirted or crimped portion thereof with a binding agent having the property of retaining its strength and binding quality so long as the milk in the bottle is at 50° F. or even somewhat higher but which when the bottle is exposed to an undue rise in temperature will soften and expand or unfold resuming more or less its original ramekin shape. The spread out appearance of the cap thus readily enables the housewife or other user of the milk to determine if it has been subjected to unfavorable temperature conditions and to sterilize before using.

Some of the mixtures described in my prior applications, referred to above, may be employed and preferably I make use of those containing rosin, paraffin wax and carnauba wax in which case there is some latitude of proportion. Preferably I employ a cap which unfolds when exposed for a time to a room temperature of say 90 or 95°. This unfolding usually occurs when the contents of the bottle reach a temperature of about 85°. Such unfold occurs rapidly or slowly depending upon the rate of increase of the temperature of the bottle on such exposure. Thus employing in parts by weight, 5 of rosin or hard rosin, 2 of paraffin and 1 of carnauba wax or in the ratio 5:3:1, or 5:5:1, good results are obtained. A somewhat more resistant composition is made in the proportion 1:1:1.

Rosin esters likewise may be employed to replace the rosin. Various synthetic resins such as phthalic glyceride resin, citric glyceride resin, urea formaldehyde resin and the like may be incorporated in this composition, also various other natural resins including shellac, kauri, copal and in general the conditions set forth in my prior applications apply here to a greater or less degree; the essential feature of the present application being the use of mixtures of composition predetermined with respect to their softening point to obtain the unfolding effect as a heat-detector.

I do not wish to limit myself to such resinous, waxy mixtures but may utilize any binding composition appropriate for the purpose applied and availed of to serve as a temperature detector.

Hard waxes such as carnauba, montan or shellac wax when softened with paraffin wax and paraffin oil or other softening agent may in some cases be utilized.

Ordinarily the container, as stated, has the paper disc closure and the hood cap is simply a cover protecting from dust and serving as a temperature indicator. However by applying a very heavy coating of the binding agent and particularly by using a softer paper which crimps closer and knits better together around the flange of the bottle a sufficiently tight stopper may be obtained in some cases so that the disc closure may be omitted.

Any slight loosening of the cap due to handling and the like which may occur, for example enabling the cap to be rotated about the flange of the bottle while the crimped portion still preserves its general shape is not intended to serve as a temperature indication, the actual unfolding and expansion of the skirted portion very clearly visible constitutes the effect sought for and obtained in accordance with the present invention.

Ordinarily a fairly stiff and springy paper should be used, strong enough to stand rough handling in transportation and capable, when the binder is softened, of springing away from the sides of the bottle or the mouth flange. The precise weight and springiness of such paper depends upon the binder chosen and its binding strength.

Another feature in the use of such hood caps is that I have found it impossible in extremely hot weather, with the contents of the bottle at approximately room temperature, to crimp the cap around the bottle mouth so that it will stay in place; the skirt immediately releasing. This therefore would serve as an indicator in dairy operations should bottles of milk or cream be inadvertently allowed to become unduly warm.

On the other hand with the bottles filled with cold milk the capping was found to progress readily in hot weather but when the bottles were exposed in the shade to a temperature of about 95° F. the hood cap soon unfolded and the cap then appeared like a ramekin inverted over the mouth of the bottle, the fluted sides of said ramekin tapering away from the sides of the bottle and spreading to the greatest extent in the lower part (bottle standing upright).

On the other hand a cap impregnated with carnauba wax and applied in like manner did not unfold under the same conditions even after standing for a much longer period; a lapse of time which would have caused serious changes to take place in milk subjected to such exposure.

In the drawings which are of a conventional or diagrammatic character, Figure 1 shows a bottle of the milk bottle type, the illustration being partly in elevation and partly in cross section. Figure 2 is a perspective view of a crimped or fluted paper cover or cup of the ramekin type. Figure 3 shows such a cup crimped about the mouth and rim of the bottle illustrated in Figure 1. Figure 4 shows a view of the bottom of the cup, after crimping, and indicates in a conventional way the irregularities of the crimped portion. Figure 5 shows the manner in which the hood cap springs away from the rim of the bottle on exposure to undue heat.

In the drawings A represents a bottle having the disc closure B and hood cap or cover C. D indicates the mark of the crimping tool. E indicates the binding material capable of becoming soft at temperatures somewhat above normal. The flutings of the crimped portion are shown at F. Like reference characters denote like parts in the several figures. The drawings indicate the hood cap to be of a relatively symmetrical character but in practice the flutings may be somewhat irregular and the edges or bottom part of the cap may be slightly uneven. In Figure 5 is shown the effect brought about by the use of a cap of springy paper which has been crimped around the bottle mouth as shown in Figure 3 and subsequently exposed to undue heat. The extent of the spread or separation from the walls of the bottle will depend largely on the springy character of the paper, and therefore will vary somewhat according to a conditions. The foregoing drawings therefore should be regarded merely as indicative of the results obtained in a general way and I do not limit myself to the exact form of depictation but may embody the invention in other forms or modes within the scope of a temperature index container.

What I claim is:—

1. A heat-indicating milk and cream container comprising a bottle with mouth and bead thereof closed with a hood cap of stiff paper crimped against said bead and held in place by an impregnum of a binding composition having the property of losing its binding character on exposure to an undue rise in temperature; whereby the crimped portion of said cap separates from said bead and expands by extension of the crimped portions thereof thereby serving to indicate such undue exposure to temperatures inimical to the keeping qualities of milk and cream.

2. A heat indicating, sealed container comprising a container closed with a hood cap folded about the container and held in place with a binding composition, said cap being made of paper of such strength and stiffness that upon the softening of the binder by heat, the cap will unfold.

3. A heat indicating, sealed container comprising a container closed with a hood cap of stiff paper held in place by a binding composition which retains its strength and binding quality up to approximately 50° F. but which softens sufficiently at higher temperatures to allow the stiffness of the paper to displace the latter from the container.

4. A heat indicating, sealed container comprising a container closed with a hood cap of stiff paper held in place by a binding composition which softens sufficiently at approximately 90 to 95° F. to allow the stiffness of the paper to displace the latter from the container.

5. In a combination of a milk bottle with mouth and bead closed with a hood cap, a hood cap made of stiff paper carrying a binding composition for holding the cap in place on the bottle said composition having the property of losing its binding character on exposure to a rise in temperature inimical to milk, whereby the cap separates from the bottle.

6. In a combination of a container and a hood cap for sealing the same folded about said container and held in place with a binding composition, a hood cap made of paper of such strength and stiffness that upon softening of the binding composition by heat, the cap will unfold.

7. In a combination of a container and a hood cap sealing the same by means of a binding composition, a hood cap of stiff paper carrying a binding composition predetermined with respect to its softening point so that upon undue heating the softening of the binder will allow the stiff paper cap to unfold.

CARLETON ELLIS.